(12) United States Patent
Nakamura et al.

(10) Patent No.: US 7,710,690 B2
(45) Date of Patent: May 4, 2010

(54) MAGNETO-RESISTANCE EFFECT ELEMENT CAPABLE OF OBTAINING A REPRODUCING SIGNAL WITH A HIGH QUALITY

(75) Inventors: Shiho Nakamura, Kanagawa-Ken (JP); Shigeru Haneda, Kanagawa-Ken (JP); Hirofumi Morise, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1282 days.

(21) Appl. No.: 11/090,074

(22) Filed: Mar. 28, 2005

(65) Prior Publication Data

US 2005/0219768 A1    Oct. 6, 2005

(30) Foreign Application Priority Data

Mar. 30, 2004  (JP) .............................. 2004-099976

(51) Int. Cl.
*G11B 5/33* (2006.01)

(52) U.S. Cl. .................................................. 360/324.1

(58) Field of Classification Search ................. 360/324, 360/324.1, 324.11, 324.12, 324.2
See application file for complete search history.

(56) References Cited

U.S. PATENT DOCUMENTS

| | | | | |
|---|---|---|---|---|
| 4,103,315 A | * | 7/1978 | Hempstead et al. | 360/110 |
| 4,686,472 A | * | 8/1987 | Van Ooijen et al. | 324/252 |
| 4,881,143 A | * | 11/1989 | Bhattacharyya et al. | 360/319 |
| 4,903,158 A | * | 2/1990 | Smith | 360/327.31 |
| 4,949,039 A | | 8/1990 | Gruenberg | |
| 5,021,909 A | * | 6/1991 | Shiiba | 360/327.1 |
| 5,089,334 A | * | 2/1992 | Mallary et al. | 428/336 |
| 5,097,372 A | * | 3/1992 | Fukazawa et al. | 360/318 |
| 5,159,513 A | * | 10/1992 | Dieny et al. | 360/324.1 |
| 5,168,409 A | * | 12/1992 | Koyama et al. | 360/317 |
| 5,206,590 A | * | 4/1993 | Dieny et al. | 324/252 |
| 5,218,497 A | * | 6/1993 | Tanabe et al. | 360/315 |
| 5,255,141 A | * | 10/1993 | Valstyn et al. | 360/321 |
| 5,258,884 A | * | 11/1993 | Howard et al. | 360/327.22 |
| 5,287,237 A | * | 2/1994 | Kitada et al. | 360/327.32 |

(Continued)

FOREIGN PATENT DOCUMENTS

JP    2001-312803    11/2001

OTHER PUBLICATIONS

U.S. Appl. No. 11/117,482, filed Apr. 29, 2005, Nakamura, et al.

*Primary Examiner*—Angel A. Castro
(74) *Attorney, Agent, or Firm*—Oblon, Spivak, McClelland, Maier & Neustadt, L.L.P.

(57) ABSTRACT

A magneto-resistance effect element can obtain a high output and makes it possible to stabilize magnetization in a magnetization free layer therein even if a sense current is caused to flow. The magneto-resistance effect element is provided with a magnetization free layer whose magnetization direction is variable, a magnetization pinned layer whose magnetization direction is pinned, and an intermediate layer provided between the magnetization free layer and the magnetization pinned layer, where when no external magnetic field is present and no current flows, the magnetization direction in the magnetization free layer is anti-parallel to the magnetization direction pinned in the magnetization pinned layer, an easy axis of magnetization in the magnetization free layer is parallel to the magnetization direction pinned in the magnetization pinned layer, and a sense current flows from the magnetization free layer to the magnetization pinned layer.

10 Claims, 13 Drawing Sheets

U.S. PATENT DOCUMENTS

| | | | |
|---|---|---|---|
| 5,287,238 A * | 2/1994 | Baumgart et al. | 360/314 |
| 5,408,377 A * | 4/1995 | Gurney et al. | 360/325 |
| 5,666,248 A * | 9/1997 | Gill | 360/324.1 |
| 5,695,864 A * | 12/1997 | Slonczewski | 428/212 |
| 5,705,973 A * | 1/1998 | Yuan et al. | 338/32 R |
| 5,726,838 A * | 3/1998 | Soeya et al. | 360/327.32 |
| 5,835,003 A * | 11/1998 | Nickel et al. | 338/32 R |
| 5,933,297 A * | 8/1999 | Hoshiya et al. | 360/324.1 |
| 6,125,019 A * | 9/2000 | Hoshiya et al. | 360/324.1 |
| 6,191,226 B1 * | 2/2001 | Matsuda et al. | 525/236 |
| 6,259,586 B1 | 7/2001 | Gill | |
| 6,633,465 B2 * | 10/2003 | Hoshiya et al. | 360/324.1 |
| 6,990,013 B2 * | 1/2006 | Sato et al. | 365/158 |
| 7,023,669 B2 * | 4/2006 | Kondo | 360/322 |
| 7,199,960 B1 * | 4/2007 | Schreck et al. | 360/75 |
| 7,236,335 B2 * | 6/2007 | Sbiaa et al. | 360/324.1 |
| 7,477,490 B2 * | 1/2009 | Gao et al. | 360/324.1 |
| 2001/0036045 A1 | 11/2001 | Kondo | |

* cited by examiner

MAGNETO-RESISTANCE EFFECT ELEMENT CAPABLE OF OBTAINING A REPRODUCING SIGNAL WITH A HIGH QUALITY

CROSS-REFERENCE TO RELATED APPLICATION

This application is based upon and claims the benefit of priority from prior Japanese Patent Application No. 2004-99976 filed on Mar. 30, 2004 in Japan, the entire contents of which are incorporated herein by reference.

BACKGROUND OF THE INVENTION

1. Field of the Invention

The present invention relates to a magneto-resistance effect element.

2. Related Art

Since such a fact was found out that, when a current was caused to flow on a plane of a multi-layer film constituted of a ferromagnetic layer/a non-magnetic layer/a ferromagnetic layer, giant magneto-resistance effect (GMR) was developed, searching for systems having a further large magneto-resistance change ratio has been made. A ferromagnetic tunnel junction element (Tunneling Magneto-Resistance Effect element: TMR element) and a CPP (Current Perpendicular to Plane) type magneto-resistance effect element which causes a current to flow in a vertical direction to a film plane has been studied up to now, and these elements have been expected as reproducing elements for magnetic recording. Especially, the CPP type magneto-resistance effect element is a candidate for a reproducing element for a recording medium with a recording density of 200 Gbpsi or more, because it has a low resistance and a large MR ratio.

In a magnetic reproducing element using a CPP type magneto-resistance effect element, such a design is employed that a hard magnet is provided adjacent to a free layer for magnetic domain control on the free layer, and when a medium magnetic field does not serve, a magnetization direction of the free layer becomes approximately perpendicular to a magnetization direction of a pinned layer (for example, refer to JP-A-2001-312803).

In the CPP type magneto-resistance effect element, however, a current is caused to flow perpendicularly to a film face. Therefore, there is such a problem that, when a current with the same level as that in the CIP (Current In-Plane) type magneto-resistance effect element which allows a current to flow within a film plane is caused to flow in order to increase a reproducing output, a vortex magnetic domain occurs in the free layer due to a self-current magnetic field effect, which results in difficulty in magnetic domain control.

It is inevitable to perform stable magnetic domain control at an application time of a sense current with a high current density in order to achieve a further high reproducing output.

As described above, when it is desired that a large reproducing output signal is obtained using the conventional CPP type magneto-resistance effect element, there occurs such a problem that magnetization of the free layer becomes unstable. A finely machining process for device or element manufacture becomes difficult to perform according to a further ultra high densification, which results in increase in cost.

SUMMARY OF THE INVENTION

The present invention has been made in view of these circumstances, and an object thereof is to provide a magneto-resistance effect element where an high output can be obtained and magnetization of a free layer is kept stable even if a sense current flows.

A magneto-resistance effect element according to a first aspect of the present invention includes; a magnetization free layer whose magnetization direction is variable; a magnetization pinned layer whose magnetization direction is pinned; and an intermediate layer which is provided between the magnetization free layer and the magnetization pinned layer, when no external magnetic field is present and no current flows, the magnetization direction in the magnetization free layer being anti-parallel to the magnetization direction pinned in the magnetization pinned layer, an easy axis of magnetization in the magnetization free layer being parallel to the magnetization direction pinned in the magnetization pinned layer, and a sense current flowing from the magnetization free layer to the magnetization pinned layer.

A magneto-resistance effect element according to a second aspect of the present invention includes: a magnetization free layer whose magnetization direction is variable; a magnetization pinned layer whose magnetization direction is pinned; and an intermediate layer which is provided between the magnetization free layer and the magnetization pinned layer, when no external magnetic field is present and no current flows, the magnetization direction in the magnetization free layer being parallel to the magnetization direction pinned in the magnetization pinned layer, an easy axis of magnetization in the magnetization free layer is parallel to the magnetization direction pinned in the magnetization pinned layer, and a sense current flows from the magnetization pinned layer to the magnetization free layer.

A magnetic reproducing apparatus according to a third aspect of the present invention includes: a power source generating a direct current superimposed on an AC component; a magneto-resistance effect element above-mentioned, which is input with the direct current; and a wave-detecting unit configured to detect an AC component included in an output signal from the magneto-resistance effect element based upon the direct current.

A magnetic reproducing apparatus according to a fourth aspect of the present invention includes: a DC power source generating a direct current; a magneto-resistance effect element above-mentioned, which is input with the direct current; a signal generator generating a high frequency signal; a mixer configured to apply a frequency conversion to an AC component in an output signal from the magneto-resistance effect element using the high frequency signal; and a rectifying unit configured to rectify an output signal from the mixer.

DETAILED DESCRIPTION OF THE INVENTION

Embodiments of the present invention will be explained below with reference to the drawings.

Prior to explanation of the embodiments of the invention, a background to the invention will first be explained with reference to FIGS. 16 to 18.

A magneto-resistance effect element provided with a free layer made from CoFe (2.5 nm), a pinned layer made of CoFe (4 nm)/Ru (1 nm)/CoFe (4 nm), an intermediate layer with a film thickness of 6 nm made of Cu and provided between the free layer and the pinned layer, a first electrode provided on a face of the free layer opposed from the intermediate layer, and a second electrode provided on a face of the pinned layer opposed from the intermediate layer was produced. Incidentally, each parenthetic numeral indicates a film thickness. The magneto-resistance effect element has a size of 100 nm×115 nm, where an easy axis of magnetization in the free layer is parallel to a magnetization pinned direction in the pinned layer and anti-parallel bias is not present in the free layer. A MR curve obtained when external magnetic field is applied in parallel to the easy axis of magnetization in the free layer without causing a current to flow in the magneto-resistance effect element is shown in FIG. 16. As understood from FIG. 16, an excellent hysteresis is obtained and the magnetization direction or magnetization orientation in the free layer has been reversed at predetermined magnetic field. The MR ratio was 0.9% at that time.

Figure 22:
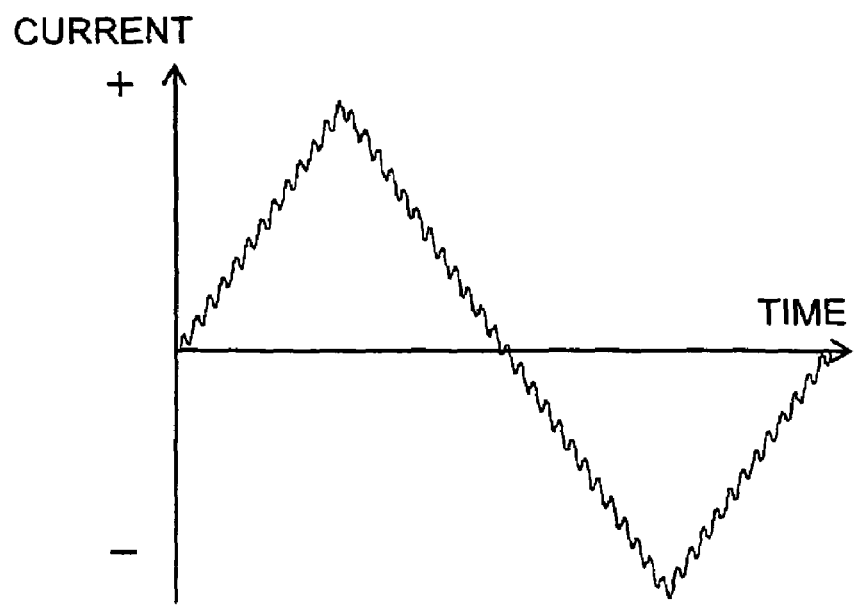
FIG. 22 is a waveform diagram showing a sense current being a DC current overlapped with an AC current component of which a frequency and a amplitude is constant.

An experiment for obtaining a differential resistance from a voltage generated between the first electrode and the second electrode in the magneto-resistance effect element when a current caused to flow in the magneto-resistance effect element was changed while a constant external magnetic field was being applied thereto was conducted. The sense current flowing in the magneto-resistance effect element is a DC current overlapped with an AC current component. The frequency and amplitude of the AC current component is constant and independent on the DC current, as shown in FIG. 22. The experimental result is shown in FIG. 17. In this experiment, the sense current polarity is defined as plus, when a sense current flows from the free layer to the pinned layer, that is, it is defined as plus when electrons flow from the pinned layer to the free layer. In the experiment, the constant external magnetic field was either one of −90 Oe, −60 Oe, −30 Oe, 0 Oe, 30 Oe, 60 Oe, and 90 Oe. The experiment was conducted to all these values. That is, the experimental result shown in FIG. 17 is characteristic curves of differential resistances obtained when a current was changed utilizing these external magnetic fields as the parameter. The differential resistance is obtained by detecting the AC component of the response signal. In FIG. 17, differential resistance values in a vertical axis are not common to all the characteristic curves and are different for respective characteristic curves.

Figure 16:
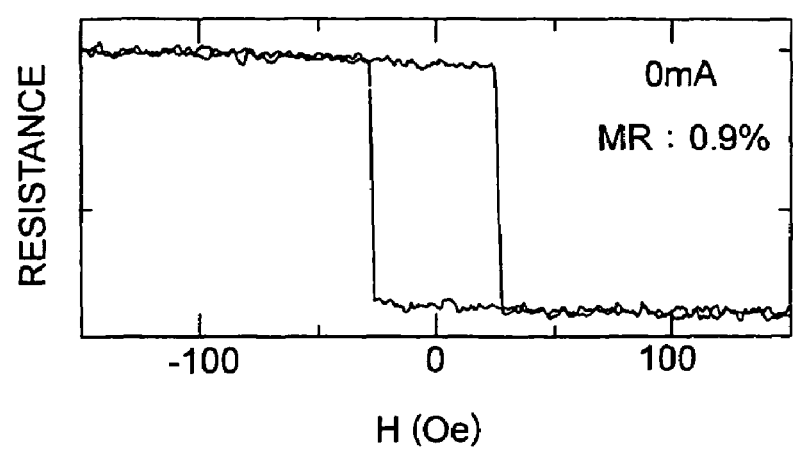
FIG. 16 is a graph showing a MR curve of a magneto-resistance effect element obtained when a current is not applied to the magneto-resistance effect element.
Figure 17:
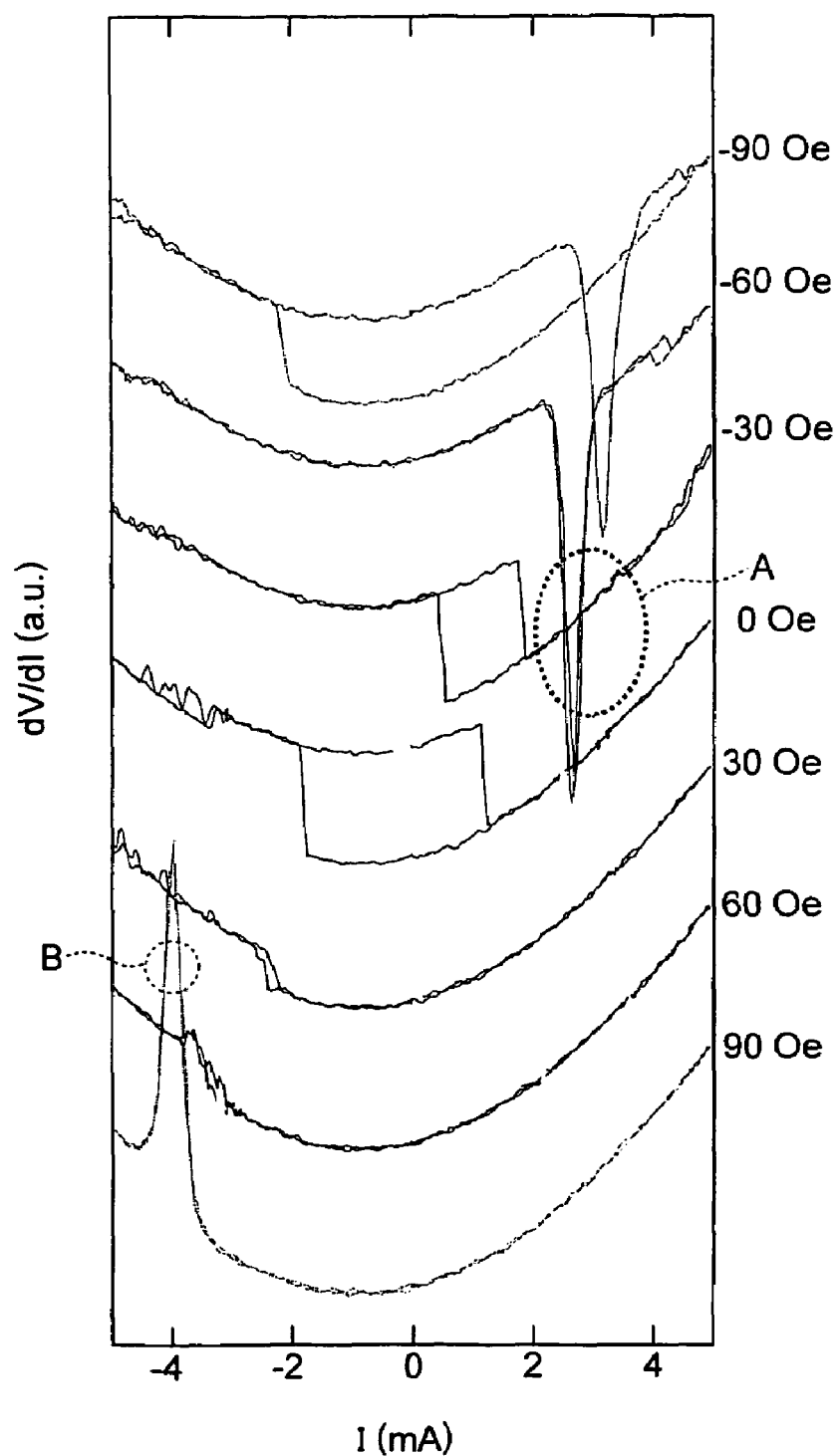
FIG. 17 is a diagram showing characteristics of differential resistance of a magneto-resistance effect element obtained when a current is changed utilizing external magnetic field as a parameter.

As understood from FIG. 17, scan at a zero magnetic field develops excellent hysteresis and a change of the differential resistance is the same as that obtained when the magnetic field shown in FIG. 16 is changed. A width of the hysteresis is collapsed at an application time of a magnetic field. A phenomenon where, when an external magnetic field with −60 Oe, i.e., such an external magnetic field that the magnetization direction in the free layer becomes anti-parallel to the pinned layer is applied, the differential resistance value rapidly drops in the vicinity of a current value of +2.6 mA, (which is also called "dip") appears (refer to the region marked "A" in FIG. 17). The present inventors found that the phenomenon appeared when the magnetization direction in the free layer was forced to be anti-parallel to the magnetization direction in the pinned layer by the external magnetic field while it was forced to be parallel thereto by the current, namely, when the external magnetic field and a spin transfer torque due to the current competed against each other.

A phenomenon that, when the external magnetic field is +90 Oe, the differential resistance sharply rises in the vicinity of the current value of −4 mA appears. The present inventors found that the phenomenon appeared when the magnetization direction in the free layer was forced to be parallel to magnetization direction in the pinned layer by the external magnetic field while it was forced to be anti-parallel thereto by the current, namely, when the external magnetic field and a spin torque generated by the current competed against each other.

Figure 23:
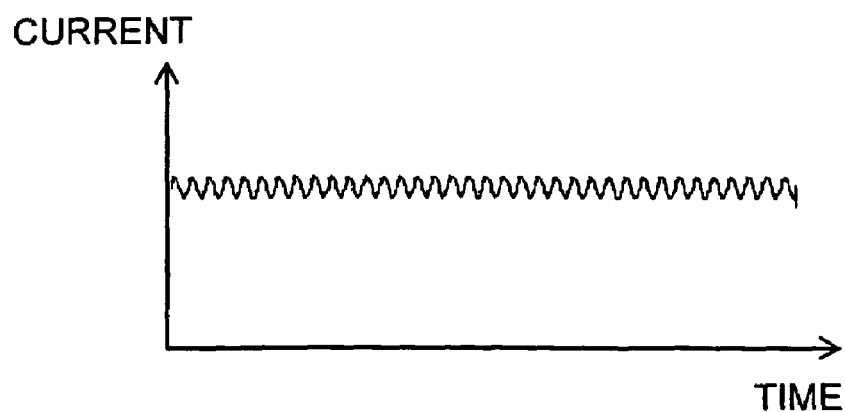
FIG. 23 is a waveform diagram showing a sense current consisting a constant DC current overlapped with an AC current component.

An experiment where, while a sense current consisting of a constant DC current overlapped with an AC current component as shown in FIG. 23 was caused to flow in the magneto-resistance effect element, the differential resistance was obtained when the external magnetic field was changed was conducted. The results obtained by this experiment are shown in FIG. 18. That is, FIG. 18 shows MR curves in a magneto-resistance effect element obtained when the constant DC currents were utilized as the parameter. In the experiment, the constant current value was either one of −2.625 mA, 0 mA, +1 mA, +2 mA, +2.625 mA, +3 mA, and +4 mA. The experiment was conducted at all of the values.

Figure 18:
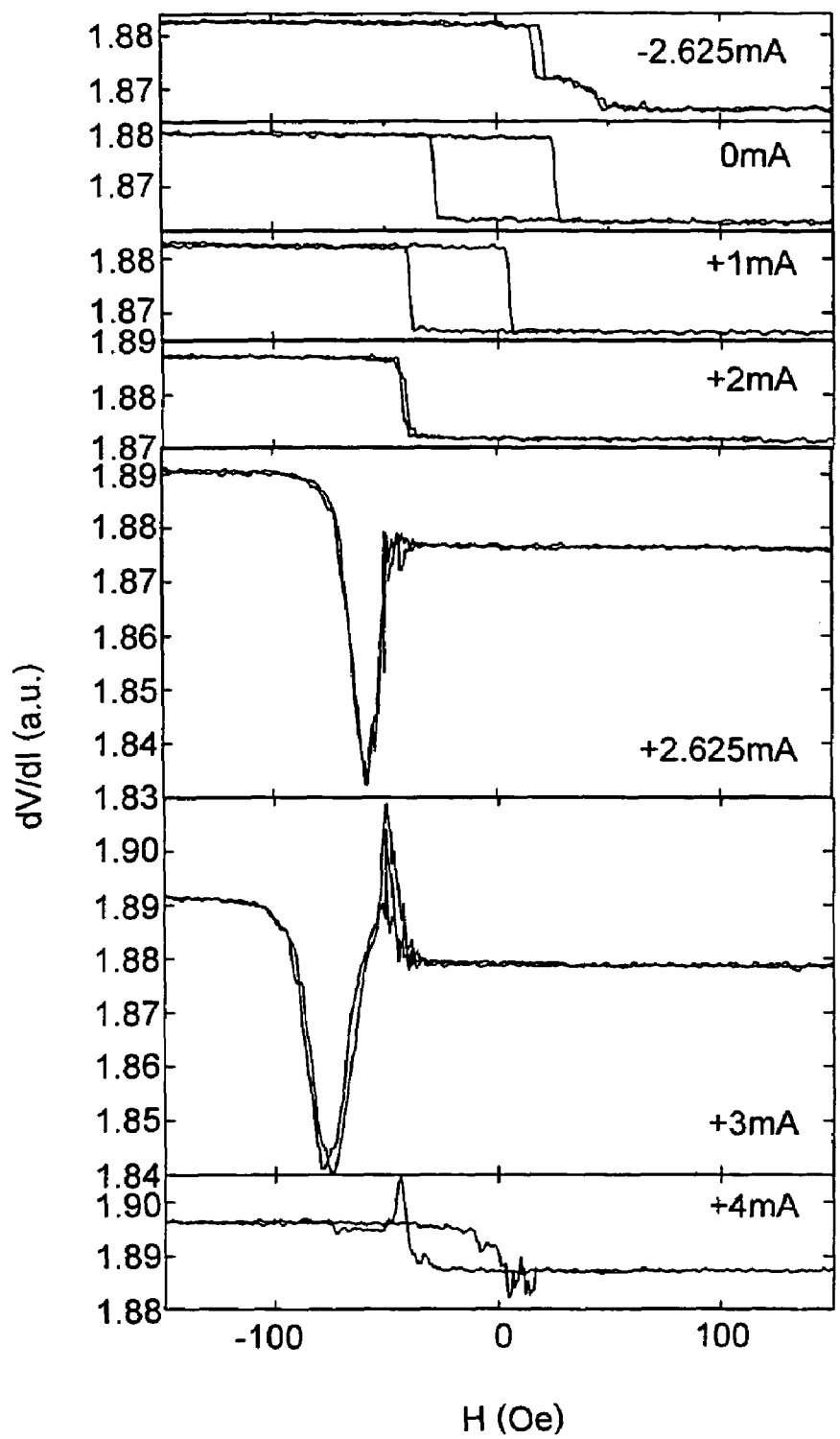
FIG. 18 is a diagram showing characteristics of differential resistance of the magneto-resistance effect element obtained when an external magnetic field is changed utilizing a current as a parameter.

As understood from FIG. 18, a phenomenon that the hysteresis was collapsed according to increase of a current from 0, and the differential resistance rapidly dropped when the current value reached about +2.6 mA appeared. When the current was further increased to +4 mA, the hysteresis was recovered. Here, the resistance change ratio obtained when the differential resistance rapidly dropped was 2.2%, which was 2.4 times 0.9% which was the MR ratio in the case shown in FIG. 16. Experiments were conducted while the size or material of the magneto-resistance effect element was changed variously, where the MR ratio exceeding 10% was obtained in some cases.

Thus, the present inventors found that a large MR ratio was obtained in the competing state of the spin torque and the magnetic field. However, the sharp change of the resistance appears at a value of an external magnetic field deviated from zero, and such a state can not be applied to a reproducing element as it is. In view of these circumstances, the present inventors thought out that, when a bias was applied to the free layer such that the magnetization direction in the free layer became anti-parallel or parallel to the magnetization direction in the pinned layer, a high reproducing output could be obtained.

The following embodiments are constituted where a bias is applied to a free layer constituting a magneto-resistance effect element such that the magnetization direction in the free layer becomes anti-parallel or parallel to a magnetization direction in a pinned layer.

First Embodiment

Figure 1:
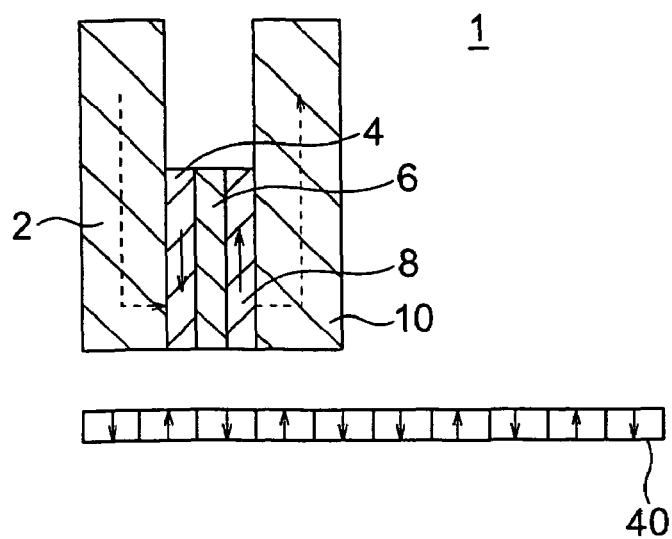
FIG. 1 is a sectional view showing a magneto-resistance effect element according to a first embodiment of the present invention.

A magneto-resistance effect element according to a first embodiment of the invention is shown in FIG. 1. A magneto-resistance effect element 1 according to the embodiment is used as a magnetic reproducing element, and it is provided with a magnetization free layer (a free layer) 4 constituted of a magnetic layer whose magnetization direction is variable, a magnetization pinned layer (a pinned layer) 8 constituted of a magnetic layer whose magnetization direction is pinned, an intermediate layer 6 provided between the free layer 4 and the pinned layer 8, a first electrode 2 provided on a face of the free layer 4 opposed from the intermediate layer 6, and a second electrode 10 provided on a face of the pinned layer 8 opposed from the intermediate layer 6.

The magnetization direction in the pinned layer 8 is a direction orthogonal to a medium 40 with a vertical magnetization. In FIG. 1, the magnetization in the pinned layer 8 is directed from a lower side (the medium 40 side) upwardly. The magnetization in the pinned layer 8 may be directed from an upper side downwardly.

On the other hand, the easy axis of magnetization in the free layer 4 is parallel to a pinned direction of magnetization in the pinned layer 8, and the magnetization direction in the free layer 4 is anti-parallel to the pinned direction of magnetization in the pinned layer 8 in a state that no current flows in the external magnetic field and between the electrodes 2 and 10. That is, a bias anti-parallel to the pinned direction of magnetization in the pinned layer 8 is eventually applied to the free layer 4. As shown with arrow A1 in FIG. 2, the anti-parallel bias is produced by applying a magnetic field from the pinned layer 8 to the free layer 4. In the magneto-resistance effect element according to the embodiment, a sense current overlapped with an AC current is caused to flow from the first electrode to the second electrode, as shown with arrow indicated by a dotted line in FIG. 1. In the sectional view shown in FIG. 2 and subsequent figures, a relationship of an upper side and a lower side of a film to the substrate is not defined.

Figure 3:
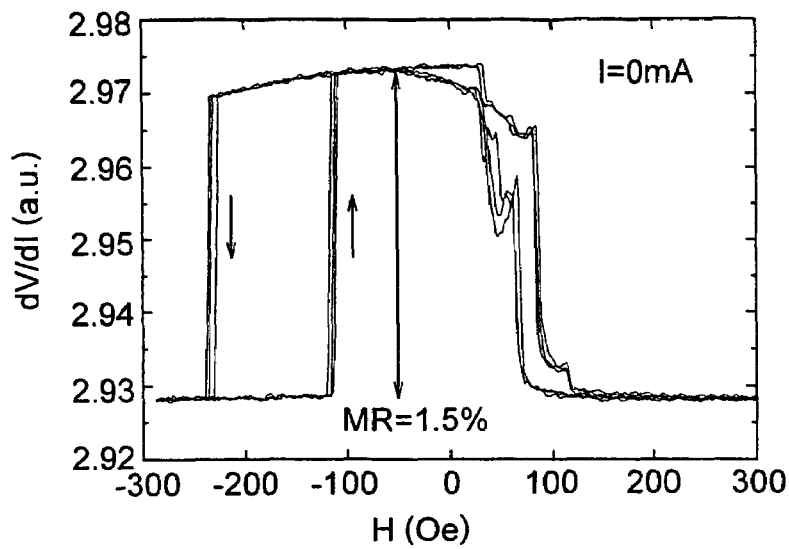
FIG. 3 is a graph showing a MR curve obtained when a zero bias is applied to the magneto-resistance effect element according to the first embodiment.
Figure 4:
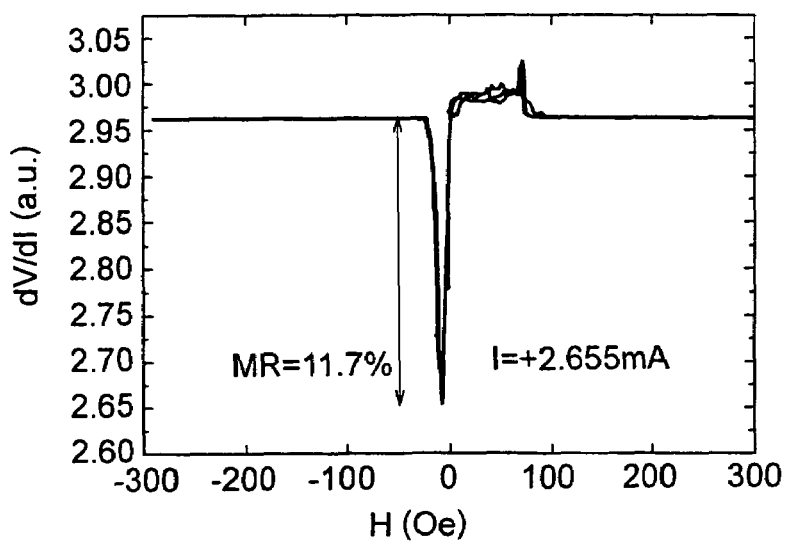
FIG. 4 is a graph showing a MR curve obtained when a predetermined current is caused to flow in the magneto-resistance effect element according to the first embodiment.
Figure 5:
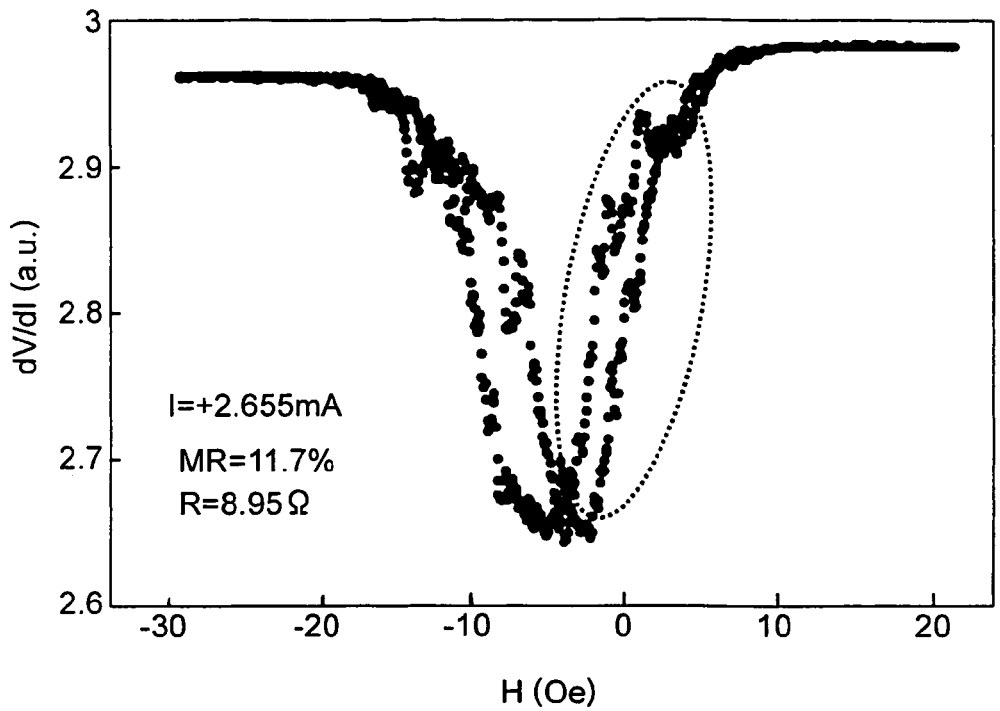
FIG. 5 is an enlarged view of the MR curve shown in FIG. 4.

In the embodiment, a MR curve in a zero bias voltage (current of 0) in the magneto-resistance effect element 1 where the free layer 4 and the pinned layer 8 are constituted of CoFe, and the intermediate layer 6 is constituted of Cu is shown in FIG. 3. FIG. 3 shows an example where the free layer is made of CoFe with a film thickness of 2.5 nm, the intermediate layer is made of Cu with a film thickness of 6 nm, and the pinned layer is made of CoFe with a film thickness of 5 nm. In FIG. 3, a rectangular hysteresis on the left side is a hysteresis showing a behavior of the free layer 4. The hysteresis of the free layer 4 has been shifted to a low resistance side (the parallel side), from which it is found that anti-parallel arrangement of magnetization is stabilized at a place where an external magnetic field is not present. The result obtained when a current of +2.7 mA is caused to flow in the magneto-resistance effect element is shown in FIG. 4. It is found from FIG. 4 that the rapid drop of the differential resistance appears in the vicinity of zero magnetic field and magnetic field characteristics have been improved by application of the anti-parallel bias. FIG. 5 is an enlarged diagram of a portion of the graph shown FIG. 4. It is understood from FIGS. 4 and 5 that a large change in resistance occurs in the vicinity of zero magnetic field and the magneto-resistance effect element according to the embodiment has characteristics suitable for a reproducing head. The MR change ratio of the magneto-resistance effect element according to the embodiment was 11.7%.

The external magnetic field parallel to the direction of the easy axis of magnetization in the free layer 4 is detected based upon a sense current flowed from the free layer 4 to the pinned layer 8 (electron flow from the pinned layer 8 to the free layer 4).

As the magnetic layer of the free layer 4 or the pinned layer 8, any of iron (Fe), cobalt (Co), nickel (Ni), alloy including at least one selected from the group of iron (Fe), cobalt (Co), nickel (Ni), manganese (Mn), and chromium (Cr), soft magnetic materials such as NiFe-based alloy called "Permalloy", CoNbZr-based alloy, FeTaC-based alloy, CoTaZr-based alloy, FeAlSi-based alloy, FeB-based alloy or CoFeB-base alloy, half metal magnetic substance oxides such as Heuslar alloy, $CrO_2$, $Fe_3O_4$, $La_{1-x}Sr_xMnO_3$, and nitrides can be used. That is, material having magnetic characteristics corresponding to application can be properly selected from these materials to be used. A two-layered structure constituted of Co or CoFe alloy/Permalloy made of NiFe or NiFeCo, or Ni, or a three-layered structure constituted of Co or CoFe alloy/Permalloy made of NiFe or NiFeCo, or Ni/Co or CoFe alloy may be used as the magnetic layer. In a magnetic layer having such a multi-layered structure, it is preferable that a thickness of Co or CoFe alloy which is an outer layer thereof is in a range of 0.2 nm to 1 nm. It is effective to use such a three-layered film or structure as a magnetic layer such as Permalloy/a non-magnetic layer (with a thickness of 0.2 nm or more to 3 nm or less) such as Cu or Ru/Permalloy, or CoFe/Ru/Co which are coupled in an interlayer switching manner as the free layer for increasing sensitivity. It is preferable in view of a magnetic field responsiveness that a total film thickness of the free layer is 10 nm or less. When the total film thickness exceeds 10 nm, it becomes difficult for the spin transfer torque effect due to a current to serve on the free layer effectively.

The magnetization of the pinned layer 8 is pinned by a exchange bias produced by providing an anti-ferromagnetic layer (not shown) between the pinned layer 8 and the electrode 10 so as to come in contact with the pinned layer 8. Alternatively, the magnetization is pinned by applying a exchange bias on such a non-magnetic layer as a Ru layer or a Cu layer/a ferromagnetic layer/an anti-ferromagnetic layer stacked. It is preferable that FeMn, PtMn, PdMn, PdPtMn, IrMn, PtIrMn or the like is used as the anti-ferromagnetic materials.

It is desirable that the intermediate layer is made from a non-magnetic metal element such as Cu, Ag, or Au, metal including at least one selected from the group of these elements, or one of oxide, nitrides, acid nitrides, and fluoride which include Al, Mg or Si. It is preferable that a thickness of the intermediate layer is 60 nm or less. More preferably, the thickness is 12 nm or less for obtaining an effective spin transfer torque effect. When oxide such as alumina or magnesium oxide, nitrides, acid nitrides or fluoride is used, a further large signal output can be obtained.

In the conventional CPP type magneto-resistance effect element, the magnetization direction in the free layer at a zero time of an external magnetic field is oriented to a direction orthogonal to the magnetization direction in the pinned layer. On the other hand, in the magneto-resistance effect element according to the embodiment, the magnetization direction in the free layer 4 at a time when a sense current is zero and an external magnetic field is zero is anti-parallel to the magnetization fixing direction in the pinned layer 8. An anti-parallel magnetization arrangement of the free layer 4 and the pinned layer 8 can be realized by using static magnetic coupling such as shown in FIG. 2 or using an interlayer exchange coupling.

It is preferable that a size of a long side (the same direction as the magnetization direction) of the free layer 8 is less than 200 nm. When the size exceeds 200 nm, a current-magnetism effect becomes significant, and an advantage or effect to be achieved can be obtained.

Figure 2:
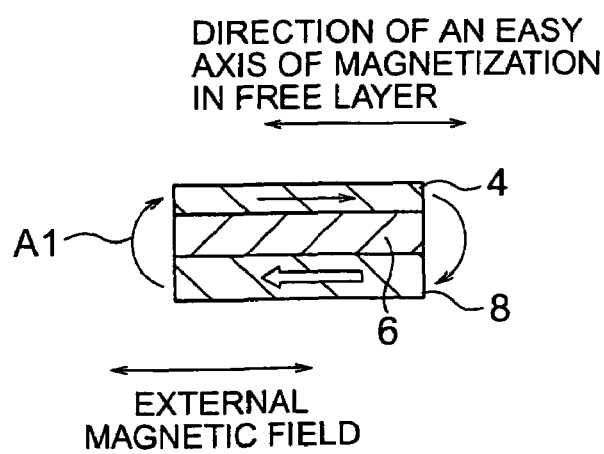
FIG. 2 is a sectional view for explaining a principle where an anti-parallel bias is applied to a free layer in the magneto-resistance effect element according to the first embodiment.

In FIG. 2, a side face of the multi-layered film from the free layer 4 to the pinned layer 8 extends in a vertical direction and the multi-layered film is formed in a vertical column shape. Even if the multi-layered film is formed in a trapezoidal shape or it is formed such that an area of a lower layer of the multi-layered film positioned near the substrate is larger than that of an upper layer of the multi-layered film, an advantage to be achieved can be obtained.

As explained above, according to the embodiment, since the anti-parallel bias is applied to the free layer, a large MR ratio (a high output) can be obtained without causing a large sense current to flow. Accordingly, since it is unnecessary to increase the sense current, magnetization of the free layer is maintained stable even if a sense current is caused to flow.

Second Embodiment

Figure 6:
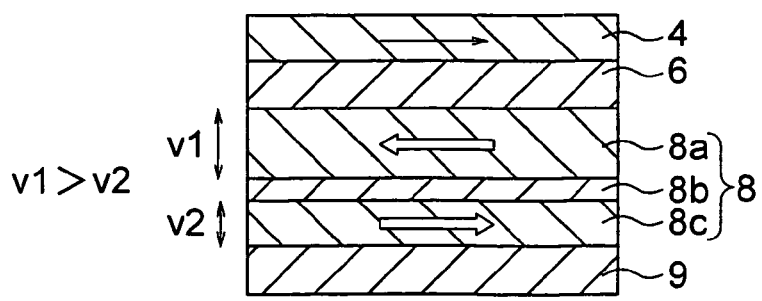
FIG. 6 is a sectional view showing a magneto-resistance effect element according to a second embodiment of the present invention.

Next, a magneto-resistance effect element according to a second embodiment of the present invention is shown in FIG. 6. The magneto-resistance effect element according to the embodiment is provided with a free layer 4, a pinned layer 8, an intermediate layer 6 provided between the free layer 4 and the pinned layer 8, and an anti-ferromagnetic layer 9 provided on a face of the pinned layer 8 opposed from the intermediate layer 6. The pinned layer 8 is provided with magnetic layers 8a and 8c, and a non-magnetic layer 8b provided between the magnetic layers 8a and 8c. In the following embodiments, the electrodes illustrated in the first embodiment are not illustrated.

The magnetic layer 8a is provided at the side of the intermediate layer 6, and the magnetic layer 8c is provided on the side of the anti-ferromagnetic layer 9. The magnetic layer 8a and the magnetic layer 8c are constituted such that they are coupled via the non-magnetic layer 8b in an anti-parallel interlayer exchange coupling. Such a constitution is employed that a volume v1 of the magnetic layer 8a is larger than a volume v2 of the magnetic layer 8c. The anti-ferromagnetic layer 9 fixes magnetization of the magnetic layer 8c through a exchange coupling. The magnetization direction in the free layer 4 is anti-parallel to the magnetization direction in the magnetic layer 8a in a state that an external magnetic field is not present and no current flows.

In the magneto-resistance effect element according to the embodiment, since such a constitution is employed that the volume v1 of the magnetic layer 8a on the side of the free layer 4 is larger than the volume v2 of the magnetic layer 8c, the free layer 4 receives an anti-parallel bias from the pinned layer 8 due to static magnetic coupling thereof with the magnetic layer 8a in the pinned layer 8.

In FIG. 6, a side face of the multi-layered film from the free layer 4 to the anti-ferromagnetic layer 9 extends in a vertical direction and the multi-layered film is formed in a vertical column shape. Even if the multi-layered film is formed in a trapezoidal shape or it is formed such that an area of a lower layer of the multi-layered film positioned near the substrate is larger than that of an upper layer thereof, an advantage to be achieved can be obtained.

In the embodiment, since the anti-parallel bias is applied to the free layer, a large MR ratio (a high output) can be obtained without causing a large sense current to flow. Accordingly, since it is unnecessary to increase the sense current, magnetization of the free layer is maintained stable even if a sense current is caused to flow.

Third Embodiment

Figure 7:
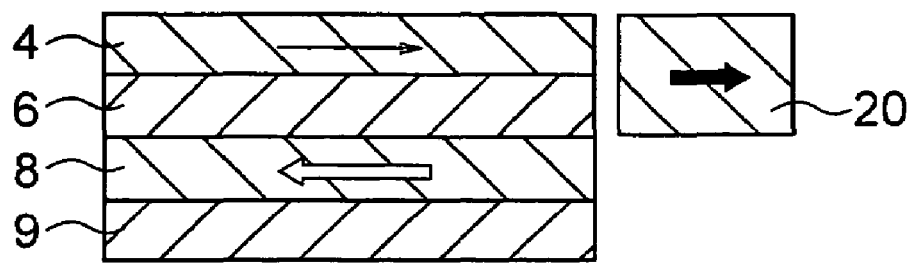
FIG. 7 is a sectional view showing a magneto-resistance effect element according to a third embodiment of the present invention.

Next, a magneto-resistance effect element according to a third embodiment of the present invention is shown in FIG. 7. A magneto-resistance effect element according to the embodiment is provided with a free layer 4, an intermediate layer 6, a pinned layer 8, an anti-ferromagnetic layer 9, and a hard bias 20. The anti-ferromagnetic layer 9 pins magnetization in the pinned layer 8 through an exchange coupling. Such a constitution is employed that the hard bias 20 is provided on a side portion (an end in the direction of the easy axis of magnetization in the embodiment) of the free layer 4 and it imparts an anti-parallel bias to the free layer 4. That is, the fact that the magneto-resistance effect element according to the embodiment is used as a magnetic reproducing element like that according to the first embodiment shown in FIG. 1 means that the hard bias 20 is provided to be opposed from the medium. It is preferable that the magnetization direction in the hard bias 20 is the same as the magnetization direction in the free layer 4.

In the embodiment, since the anti-parallel bias is applied to the free layer 4 by the hard bias 20, a large MR ratio (a high output) can be obtained without causing a large sense current to flow. Accordingly, since it is unnecessary to increase the sense current, magnetization of the free layer is maintained stable even if a sense current is caused to flow.

In FIG. 7, a side face of the multi-layered film from the free layer 4 to the anti-ferromagnetic layer 9 extends in a vertical direction and the multi-layered film is formed in a vertical column shape. Even if the multi-layered film is formed in a trapezoidal shape or it is formed such that an area of a lower layer of the multi-layered film is larger than that of an upper layer, an advantage to be achieved can be obtained.

(Modification)

Figure 8:
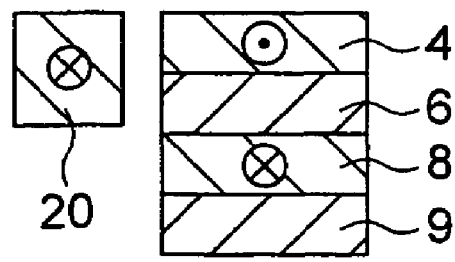
FIG. 8 is a sectional view showing a magneto-resistance effect element according to a modification of the third embodiment of the present invention.

A magneto-resistance effect element according to a modification of the third embodiment is shown in FIG. 8. A magneto-resistance effect element according to the modification has such a constitution that the hard bias 20 is provided at an end of the free layer 4 in a direction orthogonal to the direction of the easy axis of magnetization in the free layer 4 instead of providing the hard bias 20 at the end of the free layer 4 in the direction of the easy axis of magnetization thereof in the third embodiment. In the modification, it is preferable that the magnetization direction in the hard bias 20 is opposed to the magnetization direction in the free layer 4.

In FIG. 8, a side face of the multi-layered film from the free layer 4 to the anti-ferromagnetic layer 9 extends in a vertical direction and the multi-layered film is formed in a vertical column shape. Even if the multi-layered film is formed in a trapezoidal shape or it is formed such that an area of a lower layer of the multi-layered film is larger than that of an upper layer thereof, an advantage to be achieved can be obtained.

In the modification, an advantage similar to that in the third embodiment can be obtained.

Fourth Embodiment

Figure 9:
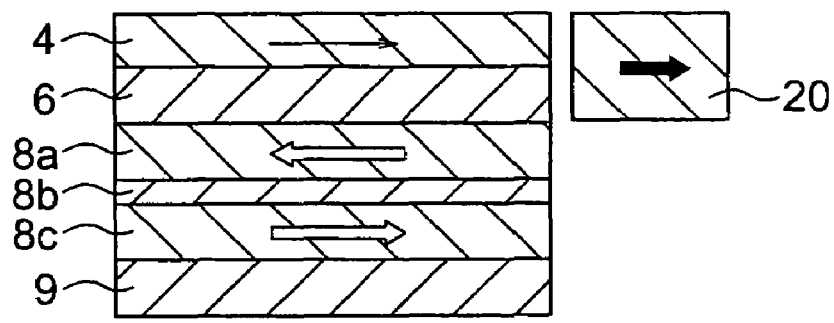
FIG. 9 is a sectional view showing a magneto-resistance effect element according to a fourth embodiment of the present invention.

A magneto-resistance effect element according to a fourth embodiment of the invention is shown in FIG. 9. The magneto-resistance effect element according to the embodiment employs such a constitution that the pinned layer 8 in the magneto-resistance effect element according to the third embodiment is replaced by a pinned layer 8 having a three-layered structure constituted of a magnetic layer 8a, a non-magnetic layer 8b, and a magnetic layer 8c. The magnetic layers 8a and 8c are coupled via the non-magnetic layer 8b in an anti-parallel interlayer exchange coupling. The hard bias 20 is provided at an end of the free layer 4 in the direction of the easy axis of magnetization thereof like the third embodiment and it imparts an anti-parallel bias to the free layer 4. It is unnecessary to define a relative volume between the magnetic layers 8a and 8c in this embodiment, which is not different from the second embodiment shown in FIG. 6. That is, the volumes can be respectively determined arbitrarily.

In the embodiment, since the anti-parallel bias is applied to the free layer 4 by the hard bias 20 like the third embodiment, a large MR ratio (a high output) can be obtained without causing a large sense current to flow. Accordingly, since it is unnecessary to increase the sense current, magnetization of the free layer is maintained stable even if a sense current is caused to flow.

In FIG. 9, a side face of the multi-layered film from the free layer 4 to the anti-ferromagnetic layer 9 extends in a vertical direction and the multi-layered film is formed in a vertical column shape. Even if the multi-layered film is formed in a trapezoidal shape or it is formed such that an area of a lower layer of the multi-layered film positioned near the substrate is larger than that of an upper layer, an advantage to be achieved can be obtained.

(Modification)

Figure 10:
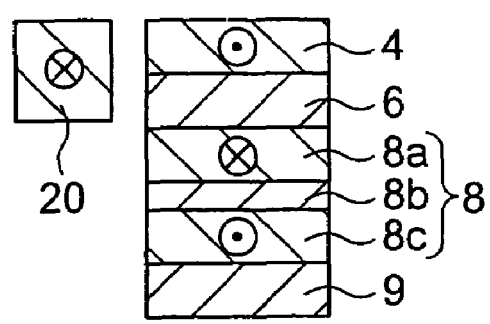
FIG. 10 is a sectional view showing a magneto-resistance effect element according to a modification of the fourth embodiment of the present invention.

Next, a magneto-resistance effect element according to a modification of the fourth embodiment is shown in FIG. 10. A magneto-resistance effect element according to the modification has such a constitution that the hard bias 20 is provided at an end of the free layer 4 in a direction orthogonal to the direction of an easy axis of magnetization in the free layer 4 instead of providing the hard bias 20 at the end of the free layer 4 in the direction of the easy axis of magnetization thereof in the fourth embodiment. In the modification, it is preferable that the magnetization direction in the hard bias 20 is opposed to the magnetization direction in the free layer 4.

In the modification, of course, an advantage similar to that in the fourth embodiment can be obtained.

In FIG. 10, a side face of the multi-layered film from the free layer 4 to the anti-ferromagnetic layer 9 extends in a vertical direction and the multi-layered film is formed in a vertical column shape. Even if the multi-layered film is formed in a trapezoidal shape or it is formed such that an area of a lower layer of the multi-layered film positioned near the substrate is larger than that of an upper layer, an advantage to be achieved can be obtained.

In the above embodiments, the anti-parallel bias is applied to the free layer. However, a case that the parallel bias is applied to the free layer in the following fifth to seventh embodiments will be explained.

Fifth Embodiment

Figure 11:
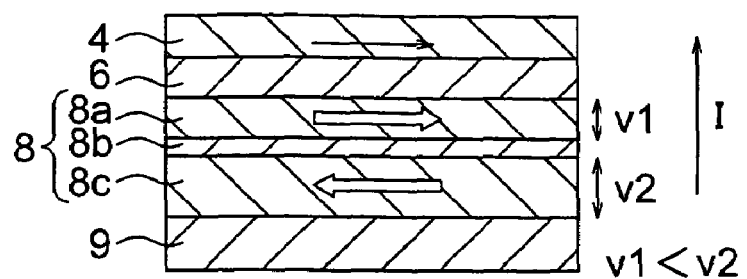
FIG. 11 is a sectional view showing a magneto-resistance effect element according to a fifth embodiment of the present invention.

A magneto-resistance effect element according to a fifth embodiment of the invention is shown in FIG. 11. A magneto-resistance effect element according to the embodiment is provided with a free layer 4, a pinned layer 8, an intermediate layer 6 provided between the free layer 4 and the pinned layer 8, and anti-ferromagnetic layer 9 provided on a face of the pinned layer 8 opposed from the intermediate layer 6. The pinned layer 8 is provided with magnetic layers 8a and 8c, and a non-magnetic layer 8b provided between the magnetic layers.

The magnetic layer 8a is provided at a side of the intermediate layer 6, and the magnetic layer 8c is provided at a side of the anti-ferromagnetic layer 9. The magnetic layer 8a and the magnetic layer 8c are constituted such that they are coupled via the non-magnetic layer 8b in an anti-parallel interlayer exchange coupling. Such a constitution is employed that a volume v1 of the magnetic layer 8a is smaller than a volume v2 of the magnetic layer 8c. The anti-ferromagnetic layer 9 fixes magnetization of the magnetic layer 8c through a exchange coupling.

In the magneto-resistance effect element according to the embodiment, since such a constitution is employed that the volume v1 of the magnetic layer 8a on the side of the free layer 4 is smaller than the volume v2 of the magnetic layer 8c, the free layer 4 receives an anti-parallel bias from the pinned layer 8 due to static magnetic coupling thereof with the magnetic layer 8a in the pinned layer 8. In the embodiment, the magnetization direction in the free layer 4 is parallel to the magnetization direction in the magnetic layer 8*a* in a state that an external magnetic field is not present and no current flows.

In the embodiment, since the parallel bias is applied to the free layer 4, a large MR ratio (a high output) can be obtained without causing a large sense current to flow. Accordingly, since it is unnecessary to increase the sense current, magnetization of the free layer is maintained stable even if a sense current is caused to flow.

In the magneto-resistance effect element according to the fifth through seventh embodiments, a sense current I overlapped with an AC current flows from the pinned layer 8 toward the free layer 4, which is different from the case that the anti-parallel bias is applied in the first to fourth embodiments. That is, electrons flow from the free layer 4 toward the pinned layer 8.

In FIG. 11, a side face of the multi-layered film from the free layer 4 to the anti-ferromagnetic layer 9 extends in a vertical direction and the multi-layered film is formed in a vertical column shape. Even if the multi-layered film is formed in a trapezoidal shape or it is formed such that an area of a lower layer of the multi-layered film positioned near the substrate is larger than that of an upper layer, an advantage to be achieved can be obtained.

Sixth Embodiment

Figure 12:
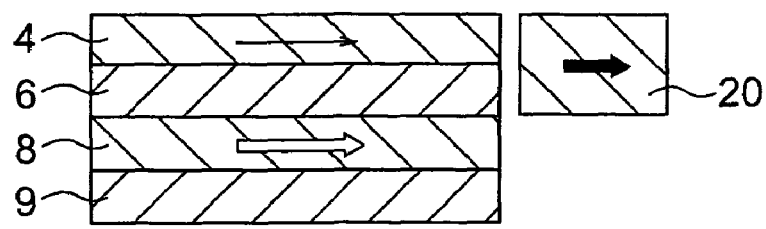
FIG. 12 is a sectional view showing a magneto-resistance effect element according to a sixth embodiment of the present invention.

Next, a magneto-resistance effect element according to a sixth embodiment of the invention is shown in FIG. 12. A magneto-resistance effect element according to the embodiment is provided with a free layer 4, an intermediate layer 6, a pinned layer 8, an anti-ferromagnetic layer 9, and a hard bias 20. The anti-ferromagnetic layer 9 fixes magnetization in the pinned layer 8 through an exchange coupling. Such a constitution is employed that the hard bias 20 is provided on a side portion (an end in the direction of the easy axis of magnetization in the embodiment) of the free layer 4 and it imparts a parallel bias to the free layer 4. That is, the fact that the magneto-resistance effect element according to the embodiment is used as a magnetic reproducing element like that according to the first embodiment shown in FIG. 1 means that the hard bias 20 is provided to be opposed from the medium. It is preferable that the magnetization direction in the hard bias 20 is the same as the magnetization direction in the free layer 4.

In the embodiment, since the anti-parallel bias is applied to the free layer 4 by the hard bias 20, a large MR ratio (a high output) can be obtained without causing a large sense current to flow. Accordingly, since it is unnecessary to increase the sense current, magnetization of the free layer is maintained stable even if a sense current is caused to flow.

In FIG. 12, a side face of the multi-layered film from the free layer 4 to the anti-ferromagnetic layer 9 extends in a vertical direction and the multi-layered film is formed in a vertical column shape. Even if the multi-layered film is formed in a trapezoidal shape or it is formed such that an area of a lower layer of the multi-layered film positioned near the substrate is larger than that of an upper layer, an advantage to be achieved can be obtained.

(Modification)

Figure 13:
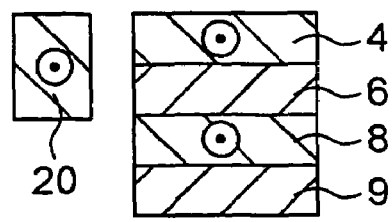
FIG. 13 is a sectional view showing a magneto-resistance effect element according to a modification of the sixth embodiment of the present invention.

A magneto-resistance effect element according to a modification of the sixth embodiment is shown in FIG. 13. A magneto-resistance effect element according to the modification has such a constitution that the hard bias 20 is provided at an end of the free layer 4 in a direction orthogonal to the direction of the easy axis of magnetization in the free layer 4 instead of providing the hard bias 20 at the end of the free layer 4 in the direction of the easy axis of magnetization thereof in the sixth embodiment. In the modification, it is preferable that the magnetization direction in the hard bias 20 is the same as the magnetization direction in the free layer 4.

In the modification, of course, an advantage similar to that in the sixth embodiment can be obtained.

In FIG. 13, a side face of the multi-layered film from the free layer 4 to the anti-ferromagnetic layer 9 extends in a vertical direction and the multi-layered film is formed in a vertical column shape. Even if the multi-layered film is formed in a trapezoidal shape or it is formed such that an area of a lower layer of the multi-layered film positioned near the substrate is larger than that of an upper layer, an advantage to be achieved can be obtained.

Seventh Embodiment

Figure 14:
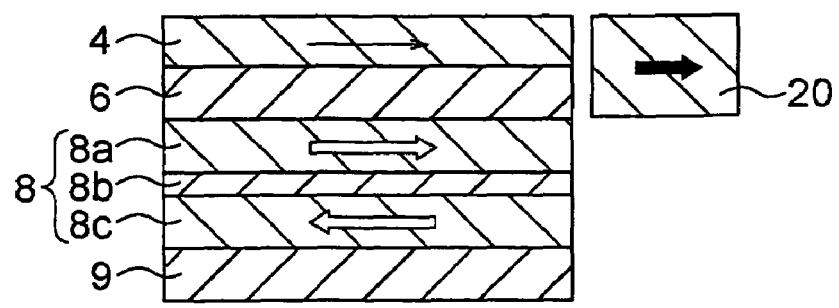
FIG. 14 is a sectional view showing a magneto-resistance effect element according to a seventh embodiment of the present invention.

A magneto-resistance effect element according to a seventh embodiment of the invention is shown in FIG. 14. The magneto-resistance effect element according to the embodiment employs such a constitution that the pinned layer 8 in the magneto-resistance effect element according to the sixth embodiment is replaced by a pinned layer having a three-layered structure constituted of a magnetic layer 8*a*, a non-magnetic layer 8*b*, and a magnetic layer 8*c*. The magnetic layers 8*a* and 8*c* are coupled via the non-magnetic layer 8*b* in an anti-parallel interlayer exchange coupling. The hard bias 20 is provided at an end of the free layer 4 in the direction of the easy axis of magnetization thereof like the sixth embodiment and it imparts a parallel bias to the free layer 4. It is unnecessary to define a relative volume between the magnetic layers 8*a* and 8*c* in this embodiment, which is not different from the fifth embodiment shown in FIG. 11. That is, the volumes can be respectively determined arbitrarily.

In the embodiment, since the parallel bias is applied to the free layer 4 by the hard bias 20 like the sixth embodiment, a large MR ratio (a high output) can be obtained without causing a large sense current to flow. Accordingly, since it is unnecessary to increase the sense current, magnetization of the free layer is maintained stable even if a sense current is caused to flow.

In FIG. 14, a side face of the multi-layered film from the free layer 4 to the anti-ferromagnetic layer 9 extends in a vertical direction and the multi-layered film is formed in a vertical column shape. Even if the multi-layered film is formed in a trapezoidal shape or it is formed such that an area of a lower layer of the multi-layered film positioned near the substrate is larger than that of an upper layer, an advantage to be achieved can be obtained.

(Modification)

Figure 15:
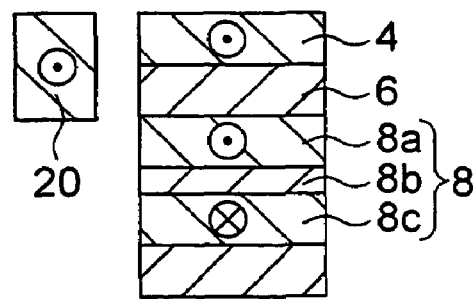
FIG. 15 is a sectional view showing a magneto-resistance effect element according to a modification of the seventh embodiment of the present invention.

Next, a magneto-resistance effect element according to modification of the seventh embodiment is shown in FIG. 15. A magneto-resistance effect element according to the modification has such a constitution that the hard bias 20 is provided at an end of the free layer 4 in a direction orthogonal to the direction of the easy axis of magnetization in the free layer 4 instead of providing the hard bias 20 at the end of the free layer 4 in the direction of the easy axis of magnetization thereof in the seventh embodiment. In the modification, it is preferable that the magnetization direction in the hard bias 20 is the same as the magnetization direction in the free layer 4.

In the modification, of course, an advantage similar to that in the seventh embodiment can be obtained.

In FIG. 15, a side face of the multi-layered film from the free layer 4 to the anti-ferromagnetic layer 9 extends in a vertical direction and the multi-layered film is formed in a vertical column shape. Even if the multi-layered film is formed in a trapezoidal shape or it is formed such that an area of a lower layer of the multi-layered film positioned near the substrate is larger than that of an upper layer, an advantage to be achieved can be obtained.

Eighth Embodiment

Figure 19A:
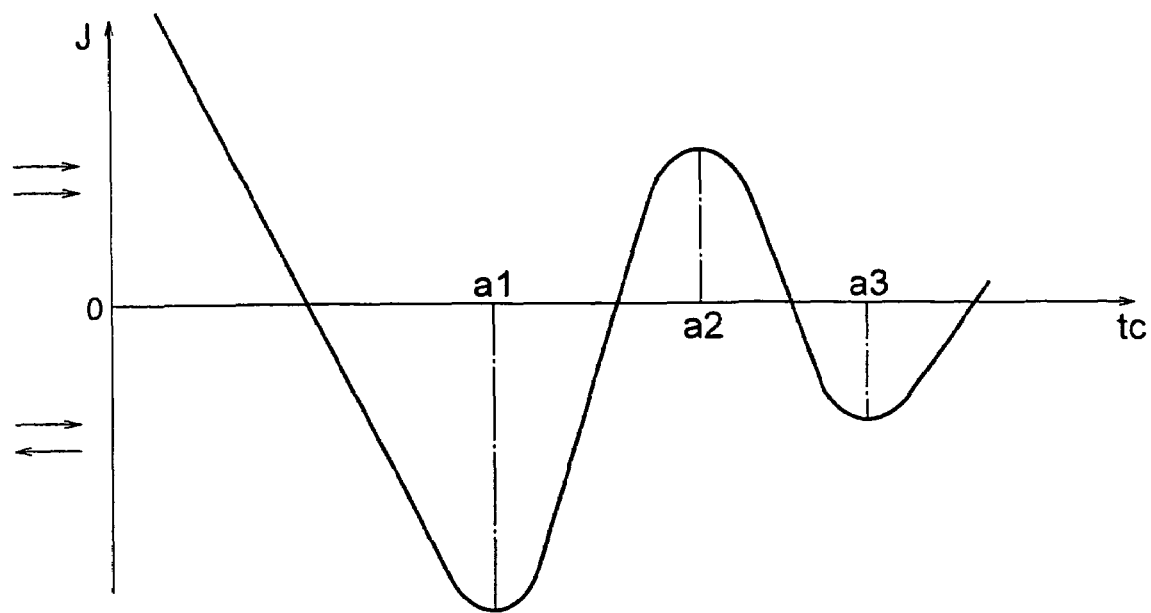
FIG. 19A is a graph showing interlayer exchange coupling energy between magnetic layers in a magneto-resistance effect element according to an eighth embodiment of the present invention.
Figure 19B:
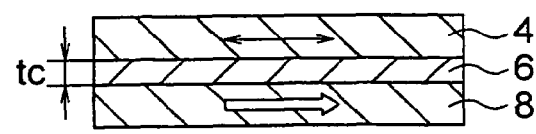
FIG. 19B is a view showing the magneto-resistance effect element according to the eighth embodiment of the present invention.

Next, a magneto-resistance effect element according to an eighth embodiment of the invention will be explained with reference to FIGS. 19A and 19B. As shown in FIG. 19B, a magneto-resistance effect element according to the embodiment is provided with a free layer 4, a pinned layer 8, and an intermediate layer 6 made of Cu and provided between the free layer 4 and the pinned layer 8. An anti-parallel bias or a parallel bias is applied to the free layer 4 by utilizing such a phenomenon that an interlayer exchange coupling energy J between two magnetic layers 4 and 8 varies according to a film thickness of the intermediate layer 6 made of Cu and provided between the two magnetic layers 4 and 8. The interlayer exchange coupling energy J between the magnetic layers 4 and 8 to a film thickness tc of the intermediate layer 6 made of Cu is shown in FIG. 19A. In FIG. 19A, such a fact that the magnetization directions of the two magnetic layers are parallel to each other in a place where the interlayer exchange coupling energy J has a positive value, while the magnetization directions thereof are anti-parallel to each other in a place where the energy J has a negative value is shown. That is, when the film thickness tc of the intermediate layer 6 made of Cu takes a value in the vicinity of a1 or a3, the interlayer exchange coupling energy J takes a negative value and the magnetization directions of the free layer 4 and the pinned layer 8 become anti-parallel to each other. On the other hand, when the film thickness tc of the intermediate layer 6 made of Cu takes a value in the vicinity of a2, the intermediate exchange coupling energy J is a positive value and the magnetization directions of the free layer 4 and the pinned layer 8 become parallel to each other. In FIG. 19A, the value of a1 is in a range of 0.8 nm to 1.0 nm, the value of a2 is in a range of 1.4 nm to 1.7 nm, and the value of a3 is in a range of 2.0 nm to 2.3 nm.

Accordingly, when the film thickness tc of the intermediate layer 6 made of Cu is set to a value in the range of 0.8 nm to 1.0 nm or 2.0 nm to 2.3 nm, the free layer 4 receives an anti-parallel bias from the pinned layer 8. On the other hand, when the film thickness tc of the intermediate layer 6 made of Cu is set in a value in the range of 1.4 nm to 1.7 nm, the free layer 4 receives a parallel bias from the pinned layer 8.

By properly selecting the film thickness tc of the intermediate layer 6 made of Cu in this manner, it is made possible to apply the anti-parallel bias or the parallel bias to the free layer 4.

The magneto-resistance effect element according to the embodiment has such a constitution that the anti-parallel bias or the parallel bias is applied to the free layer 4 by properly selecting the film thickness tc of the intermediate layer 6 made of Cu. Even when Au, Ag, alloy including at least one of Au and Ag, or one of oxide, nitrides, acid nitrides and fluoride which include Al, Mg or Si is used for the intermediate layer instead of Cu, examination about a dependency of an interlayer exchange coupling to an intermediate layer thickness is made similarly, so that a film thickness suitable for each composition can be selected.

In the embodiment, it is made possible to apply the anti-parallel bias or the parallel bias to the free layer 4, and a large MR ratio (a high output) can be obtained without causing a large sense current to flow. Accordingly, since it is unnecessary to increase the sense current, magnetization of the free layer is maintained stable even if a sense current is caused to flow.

As described in detail, according to each embodiment of the present invention, a magneto-resistance effect element which facilitates an element manufacture and can obtain a reproducing signal with a high quality can be obtained. Thereby, a reproducing head and a magnetic recording apparatus for an ultra high density magnetic recording can be provided, which will provide much industrial merit or advantage.

Next, embodiments of a magnetic reproducing apparatus will be explained.

Ninth Embodiment

Figure 20:
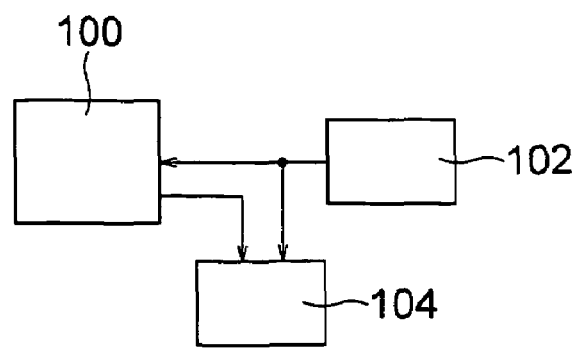
FIG. 20 is a block diagram showing a constitution of a magnetic reproducing apparatus according to a ninth embodiment of the present invention.

A magnetic reproducing apparatus according to a ninth embodiment of the invention is shown in FIG. 20. The magnetic reproducing apparatus according to the embodiment has a magneto-resistance effect element 100, a power source 102 generating a direct current superimposed on an AC component, and a wave-detecting section or unit 104 for detecting an AC component. The magneto-resistance effect element 100 may be selected from the magneto-resistance effect elements according to the first to seventh embodiments including the modifications thereof. A direct current overlapped with an AC component which is an output from the power source 102 is input into the magneto-resistance effect element 100, and the AC component in an output signal from the magneto-resistance effect element 100 is detected in the detecting unit 104, so that a sense signal is detected. As the AC component, a high frequency wave or a microwave with a frequency suitable for element characteristics and a direct current to be input in a range of 1 kHz to 20 GHz is used. By utilizing a signal overlapped with the AC component as an input signal for the magneto-resistance effect element 100, signal detection of the magneto-resistance effect element 100 is made easy. Further, since an effect of enhancing a precession motion of magnetization in the free layer in the magneto-resistance effect element 100 is expected from the AC component, a signal can be detected with a high sensitivity. An amplifier (not shown), a coil (not shown) and/or the like may be properly arranged in the magnetic reproducing apparatus.

Tenth Embodiment

Figure 21:
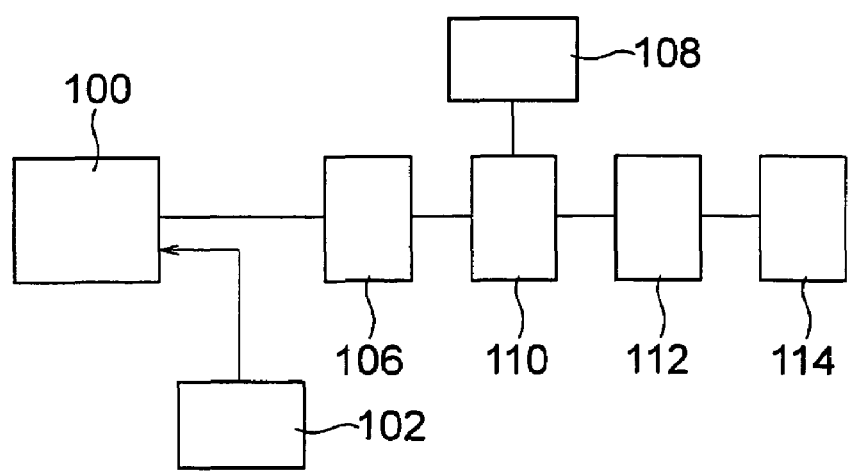
FIG. 21 is a block diagram showing a constitution of a magnetic reproducing apparatus according to a tenth embodiment of the present invention.

A magnetic reproducing apparatus according to a tenth embodiment of the present invention is shown in FIG. 21. A magnetic reproducing apparatus according to the embodiment is provided with a magneto-resistance effect element 100, a power source 102 generating a direct current superimposed on an AC component, a capacitor 106, a signal generator 108, a mixer 110, a filter 112, and a diode 114. The magneto-resistance effect element 100 may be selected from the magneto-resistance effect elements according to the first to seventh embodiments including the modifications thereof. The capacitor 106, the signal generator 108, the mixer 110, the filter 112, and the diode 114 constitute a signal processing system for processing a sense signal from the magneto-resistance effect element 100.

A direct current overlapped with an AC component generated from the power source 102 is input into the magneto-resistance effect element 100, and an output signal from the magneto-resistance effect element 100 is fed to the mixer 110 via the capacitor 106. A frequency conversion is performed in the mixer 110 using a signal output from the signal generator 108. The signal which has been subjected to the frequency conversion is fed to the diode 114 via the filter 112 to be converted to a DC component for detection. Incidentally, the signal generator 108 generates a high frequency wave or a microwave with a frequency suitable for element characteristics and a direct current to be input in a range of 1 kHz to 20 GHz. By using the magnetic reproducing apparatus according to the embodiment, the dip portion in the signal shown in FIGS. 4 and 5 can be detected as a peak of the output signal. An amplifier (not shown), a coil (not shown) and/or the like may be properly arranged in the magnetic reproducing apparatus. By using the magnetic reproducing apparatus, a signal can be detected with excellent detection sensitivity and at a high efficiency.

The magnetic reproducing apparatus according to the embodiment may be a magnetic reproducing apparatus such as a HDD (Hard Disk Drive).

In the first aspect of the present invention, the magnetization pinned layer may have a structure where first and second magnetic layers are stacked via a non-magnetic layer to be coupled in an anti-parallel exchange coupling, and one magnetic layer of the first and second magnetic layers which is positioned nearer to the intermediate layer may have a volume larger than that of the magnetic layer which is positioned far from the intermediate layer and has magnetization anti-parallel to magnetization in the magnetization free layer obtained when no external magnetic field is present and no current flows.

The magnetization free layer and the magnetization pinned layer may be coupled to each other in a statically magnetic coupling, so that the magnetization in the magnetization free layer becomes anti-parallel to the magnetization direction pinned in the magnetization pinned layer.

The magnetization free layer may be coupled to the magnetization pinned layer in an interlayer exchange coupling, and the intermediate layer may be made from Cu, Au, Ag, alloy including at least one of Cu, Au, and Ag, or one of oxide, nitrides, acid nitrides, and fluoride which include Al, Mg, or Si, the intermediate layer having such a film thickness that an interlayer exchange coupling energy between the magnetization free layer and the magnetization pinned layer may be a negative value.

In the second aspect of the present invention, the magnetization pinned layer may have such a structure that first and second magnetic layers are stacked via a non-magnetic layer to be coupled in an anti-parallel exchange coupling, and one magnetic layer of the first and second magnetic layers which is positioned nearer to the intermediate layer has a volume smaller than that of the magnetic layer which is positioned far from the intermediate layer and has magnetization parallel to magnetization in the magnetization free layer obtained when an external magnetic field is present and no current flows.

The magnetization free layer may be coupled to the magnetization pinned layer in an interlayer exchange coupling, and the intermediate layer may be made from Cu, Au, Ag, alloy including at least one of Cu, Au, and Ag, or one of oxide, nitrides, acid nitrides, and fluoride which include Al, Mg, or Si, the intermediate layer having such a film thickness that an interlayer exchange coupling energy between the magnetization free layer and the magnetization pinned layer is a positive value.

A magneto-resistance effect element may include a hard bias having a magnetization direction coincident with a direction of an easy axis of magnetization in the magnetization free layer, which is provided on a side face of the magnetization free layer.

A magneto-resistance effect element may be used as a magnetic reproducing element and arranged such that an easy axis of magnetization in the magnetization free layer is approximately perpendicular to a medium face.

A length of a long side of the magnetization free layer may be less than 200 nm.

The words used in this specification, for example "parallel", "anti-parallel", "pinned" or "free", should not be limited to its narrow meaning. For example, the word "parallel" may mean "substantially parallel" and include 175 degrees or less and include 185 degrees or more so that the inventive concepts can be attained. The word "anti-parallel" may mean "substantially anti-parallel" and include plus/minus 5 degrees or more so that the inventive concepts can be attained. The word "pinned" mean that the magnetization may be substantially pinned and not change under the external magnetic field while the magnetization of the free layer change changes its direction under the same magnetic field, whereby the magnetoresistance effect can be attained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A magneto-resistance effect element comprising:
a magnetization free layer whose magnetization direction is variable;
a magnetization pinned layer whose magnetization direction is pinned; and
an intermediate layer which is provided between the magnetization free layer and the magnetization pinned layer,
when no external magnetic field is present and no current flows, the magnetization direction in the magnetization free layer is anti-parallel to the magnetization direction pinned in the magnetization pinned layer, an easy axis of magnetization in the magnetization free layer is parallel to the magnetization direction pinned in the magnetization pinned layer, and a sense current flows from the magnetization free layer to the magnetization pinned layer and is overlapped with an AC current.

2. A magneto-resistance effect element according to claim 1, wherein the magnetization free layer and the magnetization pinned layer are coupled to each other in a magnetostatic coupling, so that the magnetization in the magnetization free layer becomes anti-parallel to the magnetization direction pinned in the magnetization pinned layer.

3. A magneto-resistance effect element according to claim 1, wherein the magnetization free layer is coupled to the magnetization pinned layer in an interlayer exchange coupling, and the intermediate layer is made from Cu, Au, Ag, an alloy including at least one of Cu, Au, and Ag, or one of oxide, nitrides, acid nitrides, and fluoride which include Al, Mg, or Si, the intermediate layer having such a film thickness that an interlayer exchange coupling energy between the magnetization free layer and the magnetization pinned layer is a negative value.

4. A magneto-resistance effect element according to claim 1, further comprising a hard bias having a magnetization direction coincident with a direction of an easy axis of magnetization in the magnetization free layer, which is provided on a side face of the magnetization free layer.

5. A magneto-resistance effect element according to claim 1, which is used as a magnetic reproducing element and is arranged such that an easy axis of magnetization in the magnetization free layer is approximately perpendicular to a medium face.

6. A magneto-resistance effect element according to claim 1, wherein the magnetization pinned layer has a structure where first and second magnetic layers are stacked via a non-magnetic layer to be coupled in an anti-parallel exchange coupling, and one magnetic layer of the first and second magnetic layers which is positioned nearer to the intermediate layer has a volume larger than that of the magnetic layer which is positioned farther from the intermediate layer and has magnetization anti-parallel to magnetization in the magnetization free layer obtained when no external magnetic field is present and no current flows.

7. A magneto-resistance effect element according to claim 6, wherein the magnetization free layer and the magnetization pinned layer are coupled to each other in a magnetostatic coupling, so that the magnetization in the magnetization free layer becomes anti-parallel to the magnetization direction pinned in the magnetization pinned layer.

8. A magneto-resistance effect element according to claim 6, wherein the magnetization free layer is coupled to the magnetization pinned layer in an interlayer exchange coupling, and the intermediate layer is made from Cu, Au, Ag, an alloy including at least one of Cu, Au, and Ag, or one of oxide, nitrides, acid nitrides, and fluoride which include Al, Mg, or Si, the intermediate layer having such a film thickness that an interlayer exchange coupling energy between the magnetization free layer and the magnetization pinned layer is a negative value.

9. A magnetic reproducing apparatus comprising:
a power source generating a direct current superimposed on an AC component;
a magneto-resistance effect element according to claim 1, which is input with the direct current; and
a wave-detecting unit configured to detect an AC component included in an output signal from the magneto-resistance effect element based upon the direct current.

10. A magnetic reproducing apparatus comprising:
a DC power source generating a direct current;
a magneto-resistance effect element according to claim 1, which is input with the direct current;
a signal generator generating a high frequency signal;
a mixer configured to apply a frequency conversion to an AC component in an output signal from the magneto-resistance effect element using the high frequency signal; and
a rectifying unit configured to rectify an output signal from the mixer.

\* \* \* \* \*